US008776985B2

(12) United States Patent
Huettner et al.

(10) Patent No.: US 8,776,985 B2
(45) Date of Patent: Jul. 15, 2014

(54) METHOD AND AN APPARATUS FOR TRANSPORTING CONTAINERS OR PACKS OF CONTAINERS

(75) Inventors: Johann Huettner, Mallersdorf-Pfaffenberg (DE); Martin Seger, Neumarkt i.d. Opf. (DE)

(73) Assignee: Krones AG (DE)

(*) Notice: Subject to any disclaimer, the term of this patent is extended or adjusted under 35 U.S.C. 154(b) by 168 days.

(21) Appl. No.: 13/438,607

(22) Filed: Apr. 3, 2012

(65) Prior Publication Data

US 2012/0261233 A1 Oct. 18, 2012

(30) Foreign Application Priority Data

Apr. 13, 2011 (DE) .................... 10 2011 016 855

(51) Int. Cl.
*B65G 47/26* (2006.01)
(52) U.S. Cl.
USPC ............... 198/459.8; 198/604; 198/626.1; 198/805
(58) Field of Classification Search
USPC .......... 198/459.1, 459.8, 461.2, 461.3, 604, 198/606, 626.1, 805
See application file for complete search history.

(56) References Cited

U.S. PATENT DOCUMENTS

| | | | | |
|---|---|---|---|---|
| 3,074,533 A | * | 1/1963 | Ninnemann et al. | ........ 198/459.8 |
| 6,607,073 B2 | * | 8/2003 | Buchi et al. | ................... 198/805 |
| 6,866,136 B2 | * | 3/2005 | Veit et al. | ................. 198/370.02 |
| 6,876,107 B2 | * | 4/2005 | Jacobs | ....................... 310/12.19 |
| 7,134,258 B2 | * | 11/2006 | Kalany et al. | .................. 53/473 |
| 8,096,409 B2 | * | 1/2012 | Wipf et al. | ..................... 198/805 |
| 2010/0140052 A1 | * | 6/2010 | Martini | ...................... 198/419.2 |
| 2012/0312660 A1 | * | 12/2012 | Harder et al. | ................ 198/604 |

FOREIGN PATENT DOCUMENTS

| | | | |
|---|---|---|---|
| DE | 19505997 | 8/1996 | ............. B65B 35/44 |
| DE | 102008040204 | 1/2010 | ............. B65G 47/26 |
| EP | 1123886 | 8/2001 | .......... B65G 47/244 |
| WO | WO03105324 | 12/2003 | ............. H02K 41/00 |
| WO | WO 2008/022296 | 2/2008 | ............. B65G 47/08 |

OTHER PUBLICATIONS

German Search Report issued in corresponding German Appln. No. DE 102011016855.9 dated Mar. 16, 2012 (5 pages).
European Search Report issued in corresponding application No. 12162836.6, dated Jul. 24, 2012 (8 pgs).

* cited by examiner

*Primary Examiner* — Leslie A Nicholson, III
*Assistant Examiner* — Keith R Campbell
(74) *Attorney, Agent, or Firm* — Hayes Soloway P.C.

(57) ABSTRACT

A method for transporting containers or groups of containers, wherein the containers are conveyed along a predefined transport path and with a predefined distance (D) between the containers or groups of containers and a conveyor unit and a conveyor unit, which conveyor unit transports the containers by means of at least two first conveying elements for conveying the containers, which first conveying elements respectively move along a first predefined movement path on a circulating carrier, and which first conveying elements contact the containers with respectively one contacting body and in this way vary a distance between the containers or groups of containers.

17 Claims, 2 Drawing Sheets

METHOD AND AN APPARATUS FOR TRANSPORTING CONTAINERS OR PACKS OF CONTAINERS

BACKGROUND OF THE INVENTION

The present invention relates to a method and an apparatus for transporting containers or container packs. Such transport apparatus and transport methods have been known from the prior art for a long time. They are used for example for transporting containers or groups of containers from a treatment device such as a filling unit to a further treatment device such as for example a labelling machine or a capping machine. Usually, the containers or groups of containers are here transported separately.

In this process, these containers or groups of containers have predefined distances from each other during transport. During the production of the beverage containers it may be possible that different treatment systems operate with different container distances or that a pitch between the containers has to be changed. To this end, apparatus are known from the prior art which change a pitch of the containers. Examples of these include infeed worms to which the containers are fed without any distance between them and which subsequently change these distances between the containers. The disadvantage of these infeed worms is that the containers have to be fed to these without any gaps in between and these worms in turn forward the containers with a precisely defined distance. However, it may be partially desirable to adjust any desired distances between the containers, for example from one desired distance to another desired distance.

SUMMARY OF THE INVENTION

The present application is therefore based on the object of providing transport apparatus wherein distances between the individual articles to be conveyed can be adjusted. It should further also be possible to feed the containers or groups of containers with different distances between them.

In a method according to the invention for transporting containers and/or groups of containers, a plurality of containers and/or groups of containers is conveyed along a specified transport path with a specified distance between the containers and/or groups of containers to a conveyor unit and the conveyor unit transports the containers and/or groups of containers using at least two first conveying elements for conveying the containers and/or groups of containers, which conveying elements respectively move along a first specified travel path on a circulating carrier, and which conveying elements contact the containers and/or groups of containers respectively with one contacting body, thus changing a distance between the containers or groups of containers.

Subsequently, for the sake of simplification, the term containers will also be used instead of the term containers and/or groups of containers. The term group of containers is to be understood to mean in particular an assembly of several containers (in particular a pack), wherein the individual containers are advantageously arranged in a specified position relative to each other.

According to the invention, the conveying elements are driven by means of a drive unit implemented as a linear motor, wherein the drive unit is in operative connection with magnets of the conveying elements and a control unit allows the first conveying elements to be moved independently from each other, so that the distance between two conveyed containers or groups of containers can be or is changed.

According to the invention, it is therefore proposed to provide an apparatus or a method which allows, by means of independent linear motor drives, essentially any desired change of a distance between the respective containers or groups of containers to be achieved. Unlike the prior art, therefore, a pitch between the containers or groups of containers is not modified by a specified dimension, nor is it necessary for the containers to be fed to this apparatus at a precisely predefined distance.

In an advantageous method, the containers are supported by means of support means at least at times during transport thereof by the conveying elements. Thus it is possible for the containers or groups of containers to be delivered by means of a conveyor belt and subsequently for a distance between the containers to be changed. However, it would also be possible for the containers to be guided for example by means of gripping elements which support the carrier rings of the containers.

In a further advantageous method, the containers are guided during transport thereof by the conveying elements also in a direction extending parallel to the transport path. In this way the containers are prevented from deviating laterally from the transport path during transport thereof. Thus for example, it would be conceivable to provide lateral guiding rails which keep the containers substantially on their transport path. However, it would also be possible for the conveying elements themselves to be adapted such that the containers or groups of containers (or packs) cannot deviate laterally from the transport path. Thus, the conveying elements could include for example curved sections or recesses which are respectively used for receiving the containers or groups of containers.

Also, the conveying elements themselves could ensure that the containers cannot deviate laterally from their transport path, for example by way of the conveying elements contacting the containers or groups of containers from two different sides which are opposite each other.

Advantageously, the containers are transported using the conveyor unit in a filling or labelling unit which respectively fills or labels the containers.

In a further advantageous method, the transport elements are at least at times moved also in a direction opposite to the transport direction of the containers or groups of containers. This movement is here advantageously used for returning the conveying elements relative to their carrier. Advantageously, a speed of movement of the conveying elements in a direction opposite to the transport path of the containers is at least at times higher than a transport speed of the conveying elements along or in the direction of the transport path. In a further advantageous method, an average speed of the conveying elements running in the direction opposite to the transport path or the transport direction of the containers is higher than an average speed of the conveyor elements running in the transport direction of the containers or groups of containers. In this way it can be achieved that the individual conveying elements are returned relatively quickly to their output position compared to their transport movement. This in turn makes it possible to operate with a relatively low number of conveying elements, which will respectively be returned in idle operation, i.e. without conveying a container, at a higher speed than during the transport movement with a container.

Advantageously, the containers or groups of containers are contacted during transport thereof by the conveyor unit on at least three areas of the containers, which are spaced apart from each other, for example in a bottom area and in two wall areas. Thus, there is advantageously no overlap between these areas.

In a further advantageous method, the (transport) speed of the containers is changed by way of a lateral engagement therein during transport thereof by the first conveying elements. The conveying elements may here for example be in a non-positive contact with corresponding lateral walls of the containers.

The present invention is further directed to an apparatus for transporting containers or groups of containers, which comprises a first conveyor unit that transports the containers along a predefined transport path. The conveyor unit includes a support unit for supporting the containers or the group of containers during transport thereof as well as at least two first conveying elements for conveying the containers, which conveying elements are respectively arranged along a first predefined travel path in a movable manner on a circulating carrier, and which conveying elements respectively have one contacting body for contacting the containers as well as at least one magnet and in particular a permanent magnet.

According to the invention, the apparatus has a drive unit implemented as a linear motor for driving the conveying elements, which drive unit (in particular magnetic) is at least at times in operative connection with the permanent magnets of the conveying elements so as to move these, and the apparatus further includes a control unit which allows a relatively independent movement of the first conveying elements, so that a distance between two conveyed containers or groups of containers can be changed.

On the part of the apparatus, it is also proposed to move a plurality of conveying elements using linear motor technology, which can subsequently change the distances between the articles to be conveyed, i.e. the containers or groups of containers.

The support unit may again be for example, as described above, a transport belt, relative to which the containers can be displaced. However, also transport rails or firm bases may be provided. However, in a further embodiment it would also be conceivable for a support unit such as a transport belt to be installed upstream thereof and for the individual containers to be subsequently gripped.

In a further advantageous embodiment, the apparatus includes a plurality of first conveying elements, preferably at least 5 conveying elements, preferably at least 7 conveying elements and particularly preferably at least 10 conveying elements.

By means of the apparatus according to the invention, a pitch between the containers or groups of containers can be both reduced and increased.

It is further possible for a movement of the conveying elements, in particular during transport of the containers, to be accelerated or decelerated. In this connection, the movement of a conveying element, as mentioned above, can be carried out independently from the movement of a further conveying element along the predefined transport path. Thus, for example, the movement of a first conveying element can be accelerated and the movement of a further conveying element can at the same time be decelerated. Advantageously, the movement of each conveying element is merely limited by the preceding and the following conveying elements.

In a further advantageous embodiment, the conveying elements may also include a plurality of contacting bodies, which are spaced apart from each other in the longitudinal direction of the containers or the groups of containers. In this way, the containers or groups of containers can be guided in a more stable manner.

In a further advantageous embodiment, at least one contacting body contacts the container or a group of containers in an area that is spaced apart from a bottom of the containers.

The groups of containers may here be arranged for example as a pack, however, it would also be possible for them to be already placed in boxes and to be transported together with these boxes.

In a further advantageous embodiment, the apparatus comprises at least one second conveying element for conveying the containers, which second conveying element is provided in a manner to be movable along a second predefined travel path on a second circulating carrier, and for the second conveying element also to include a contacting body for contacting the containers. Advantageously, also the second conveying element includes a permanent magnet so as to be advantageously moved relative to the second carrier by means of a drive unit.

It is possible here for the two travel paths to be parallel to each other, so that for example the travel paths are offset from each other in a longitudinal direction of the containers. It is also possible for the first travel path to surround the second path, or it would also be possible for the travel paths to be opposite each other in relation to the transport path of the containers. Further, also a plurality of second conveying elements may be provided which will particularly preferably also be movable or controllable independently from each other (in particular in relation to the second carrier).

In one advantageous embodiment, at least one container can be conveyed along its transport direction between the contacting body of the second conveying element and a contacting body of a first conveying element. Thus it is possible for the two contacting bodies to contact the container on two sides which are opposite each other. In this way, also a distance or a pitch between the containers or groups of containers can be adjusted. In one advantageous embodiment, the contacting bodies contact the container on walls that are opposite each other.

In a further advantageous embodiment, the apparatus includes a position detection unit for detecting a position of at least one conveying element along the transport path. As a function of this position, the conveying elements can advantageously be controlled, i.e. for example accelerated or decelerated. The position detection unit may here include for example light barrier elements which detect the positions of the conveying elements. Moreover however, it would also be possible for the position detection unit to include inductive elements such as for example electromagnets, by means of which the position of the individual conveying elements may be detected. Moreover, it would also be conceivable for the position detection unit to be integrated in the drive unit for driving the conveying elements and to detect the respective positions of the individual conveying elements for example on the basis of the flowing currents. In this way, the position of all the conveying elements can advantageously be determined. As a result of this position detection, also the movements of the individual conveying elements can be controlled.

In a further advantageous embodiment, at least one conveying element has a base body and the contacting body is particularly preferably disposed on this base body in a movable manner. The base body may here be provided on the above-mentioned carrier in a movable manner and the contacting body in turn on said base body. Advantageously, also a drive unit for generating a movement of the contacting body relative to the base body is provided. As a result of this movement, for example, a rotation of the containers or groups of containers may be effected. Advantageously, this movement is carried out in a direction that is not parallel to the transport path of the containers or groups of containers and is in particular oblique or vertical thereto. Advantageously, rotation can also be achieved by way of a brief relative rotation of the opposite conveying elements, which is superimposed on the normal transport movement. In addition to the transport of the containers and the change of the distance between the containers, a rotation of the containers or groups of containers about a predefined rotary axis is conceivable in this way.

Particularly advantageously, the movability of the contacting body relative to the base body is also used for reducing any undesired pushing forces of following containers or groups of containers. Here, the contacting body acts in a way similar to an overrun brake. A brake will be activated the more intensively the higher the pushing force of the following containers is, and this brake will then receive the pushing forces and will prevent the base body from being pushed, thus losing its synchronicity with the electromagnets. This is generally referred to as a tracking error.

Also, the movability of the contacting body relative to the base body can be used in order to adapt the apparatus to different dimensions of the containers or groups of containers. Advantageously therefore, at least one conveying element, and preferably a plurality of conveying elements, are suitable for receiving different containers or groups or containers and/or can be adapted to containers or groups of containers of different sizes.

In a further advantageous embodiment, at least one base body moves at least at times parallel to the transport path of the containers.

In a further advantageous embodiment, all of the base bodies of the first conveying elements move, and particularly preferably also all of the base bodies of the second conveying elements move at least at times parallel to the transport path of the containers. Particularly preferably here, at least one base body is laterally offset relative to the transport path of the containers. Advantageously, a plurality of base bodies is, particularly preferably all of the base bodies are at least at times laterally offset relative to the transport path of the containers. Particularly advantageously, the engagement of the contacting body will be above the first support surface provided by the transport belt, and particularly advantageously from the side.

In a further advantageous embodiment, the apparatus includes at least one guide device that guides a movement of the containers in a direction extending parallel to the transport path. Thus, for example, a lateral rail may be provided, advantageously two rails. Thus, guiding elements are provided here which keep the containers on their transport path. However, it would also be conceivable for the guide device to be implemented by the transport element itself, i.e. that for example the containers or the groups of containers are clamped between two opposite conveying elements.

In a further advantageous embodiment, the conveying unit is immediately followed by a unit for treating the containers. This further unit for treating containers may for example be a filling machine that fills the containers with a liquid medium, especially with a liquid. However, this further unit may also be a capping machine that closes the containers with caps, a labelling unit or the like. Apart from that, provided that groups of containers are transported, this downstream unit may be a palletising unit.

In a further advantageous embodiment, an apparatus for moulding plastic performs into plastic containers, such as in particular, but not exclusively, a stretch blow moulding machine, may be installed in the transport direction of the containers upstream of the conveyor unit.

In a further advantageous embodiment, the apparatus and/or the conveying elements is/are designed in such a way that the speed of the containers is changed (at least at times) during transport thereof by the first conveying elements by way of a lateral engagement.

BRIEF DESCRIPTION OF THE DRAWINGS

Further advantageous embodiments will become evident from the attached drawings, wherein.

DETAILED DESCRIPTION OF THE INVENTION

Figure 1:
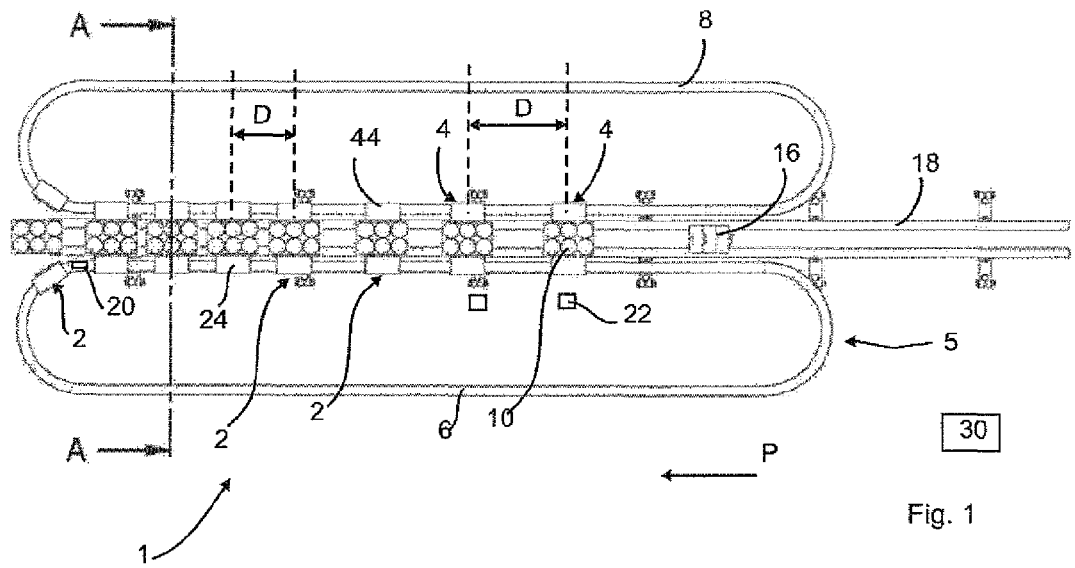
FIG. 1 shows a top view of a first embodiment of an apparatus according to the invention.

FIG. 1 shows an apparatus 1 according to the invention for transporting groups of containers 10. More specifically, this is here a pack consisting of six containers each, which are transported along a transport path P.

Reference numerals 2 respectively relate to first conveying elements which here laterally contact the respective groups of containers 10 and convey them along the transport path P. The individual first conveying elements 2 are here respectively formed (stationary) on a circulating carrier 6. Reference numeral 16 identifies a support unit which supports the containers or groups of containers 10. This can here be a circulating chain, on which the containers or groups of containers 10 are transported. Reference numeral 18 identifies lateral (stationary) carriers, in relation to which the support unit 16 may in turn be supported. The transport chain is shown here only in a simplified form, however, it may preferably also be a completely circulating chain, so that altogether a movable support surface for the containers or packs 10 may be formed. The support units 16 advantageously move at a constant speed, in particular along the transport path P.

Reference numeral 20 very schematically identifies a drive unit used for moving the individual conveying elements 2. Thus, a plurality of electromagnets may be arranged on the carrier, which can respectively be independently controlled like a linear motor and which can move the individual conveying elements 2. Reference numeral 30 very schematically identifies a control unit that controls the movements of the individual conveying elements 2. In the illustration shown in FIG. 1, a distance D between the individual packs along the transport path P is reduced, i.e. the individual conveying elements 2 are controlled in such a way that the distance of the arriving packs is reduced from right to left. Apart from the conveying elements shown, a plurality of further conveying elements 2 (not shown) may be arranged, which in turn move along the carrier 6 in a counter-clockwise direction.

Reference numeral 24 identifies a base body of the individual conveying elements, which is disposed to be movable on the carrier 6.

Reference numerals 4 identify second conveying elements which are arranged on a second carrier 8 also in a manner to be movable and to be controllable independently from each other. These second conveying elements, too, each have a base body 44. In the embodiment shown in FIG. 1, the packs 10 are respectively received or clamped between a first conveying element 2 and a second conveying element 4 and are transported in this way. In the embodiment shown in FIG. 1, respectively one conveying element 2 and a conveying element 4 associated therewith move, at least in sections, at the same speed. The first conveying elements 2 and the second conveying elements 4 preferably move in opposite circulation directions.

Reference numeral 22 identifies a position detection unit used to determine the positions of the individual conveying elements relative to the carrier. As a function of this detected position, the movement of the conveying elements 2 can be controlled. Corresponding position detection units may also be present for the second conveying elements 4. Reference numeral 5 identifies the transport unit in its entirety.

Figure 2A:
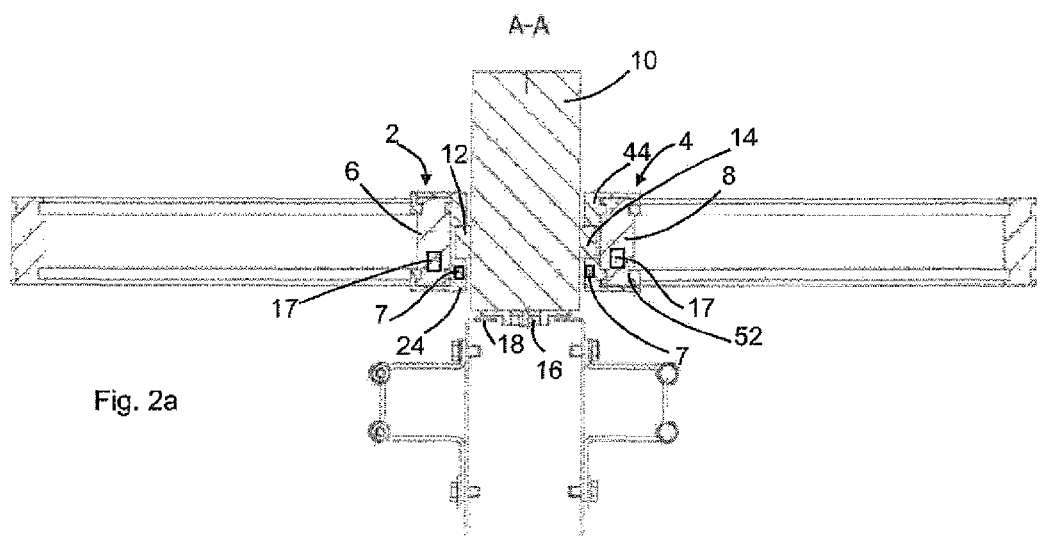
FIG. 2a shows a view along line AA in FIG. 1.

FIG. 2a shows a sectional view along line AA of FIG. 1. Here again, the two carriers 6 and 8 can be seen, on which the conveying elements 2 and 4 are arranged. Reference numeral 7 very schematically identifies a permanent magnet that is respectively provided on the individual conveying elements 4. This permanent magnet interacts here with an electromagnet or a plurality of electromagnets 17 which are arranged on the carrier 8 (and also on the carrier 6), in order to effect in this way the movement of the individual conveying elements 2 and 4. Here too, a first contacting body 12 can be seen that is provided on the first conveying element 2, as well as a second contacting body 14 provided on the conveying element 4. The pack 10 is received between these two contacting bodies. Here too, this illustration again shows the support unit 16 that is used for supporting the pack 10 and that is in turn supported relative to a carrier 18. The drive for the support units 16 is not shown here. The contacting elements 12, 14 can be implemented here in an elastic manner or can be spring mounted.

The conveying elements 2, 4 can engage here in the respective carriers 6, 8 so as to be held thereon. Thus, the carriers 6, 8 may include recesses 52 in which the projections of the respective conveying elements 2, 4 engage, in order to improve guiding in this way. It would also be conceivable to use air pressure in order to reduce friction between the individual conveying elements 2, 4 and the respective carriers 6, 8 thereof.

Figure 2B:
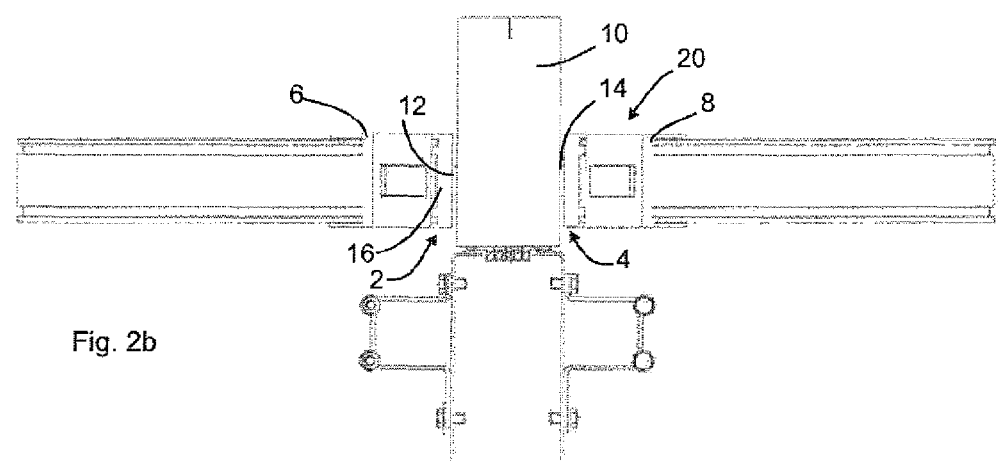
FIG. 2b shows a further lateral view of the apparatus of FIG. 1.

FIG. 2b shows a further illustration of the apparatus according to the invention. Here again, the two carriers 6 and 8 can be seen, on which the conveying elements 2 and 4 are arranged to be movable. The conveying elements 2 and 4 can here be movably held relative to the carriers 6 and 8 by means of rollers, however, it would also be conceivable to provide a purely magnetic guiding mechanism or a sliding connection. Apart from that, also a further support unit may be provided which supports the two conveying elements 2 and 4 and in relation to which these can roll, for example.

Figure 3:
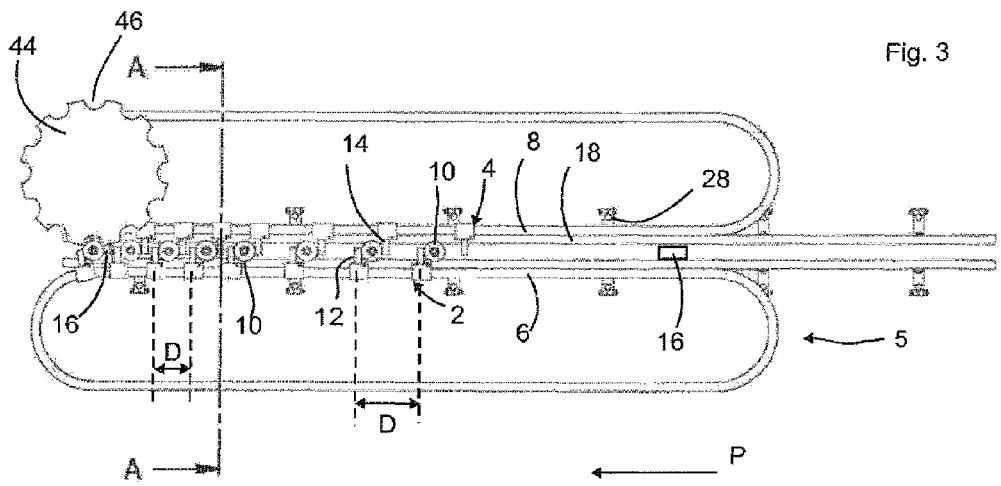
FIG. 3 shows a further embodiment of an apparatus according to the invention.

FIG. 3 shows a further embodiment that is here used for transporting containers 10. Here too, a plurality of first conveying elements 2 is provided, which respectively contact the containers with their contacting bodies 12. In the embodiment shown in FIG. 3, also a distance D between the containers from right to left is reduced to such an extent that these can accurately engage in a synchronisation star wheel 48 that has a plurality of recesses 46 along its external circumference. Apart from that, here too, support units 16 (only schematically shown), such as a transport chain, are provided.

The apparatus shown in FIG. 3 also has a plurality of second conveying elements 4 which also move along the transport path P. The individual containers 10 are here respectively received between a conveying element 2 and a second conveying element 4. More specifically, the containers are here contacted by the respective contacting bodies 12 and 14 on respectively opposite sides and are thus as it were clamped along the transport path P.

Figure 4A:
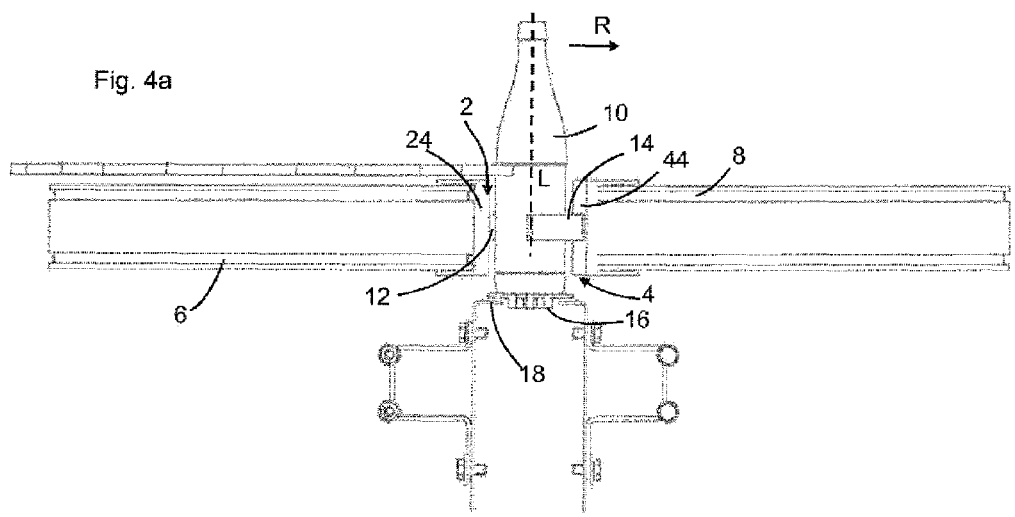
FIG. 4a shows a view of the apparatus of FIG. 3 along line AA in FIG. 3.

FIG. 4a shows a view along line AA of FIG. 3. What can be seen here again are the two conveying elements 2 and 4 which are respectively arranged to be movable on the carriers 6 and 8. Reference numeral 7 again very schematically identifies a permanent magnet provided on the respective conveying elements 4 (and correspondingly also on the conveying elements 2). Reference numeral 17 again identifies an electromagnet or a series or plurality of electromagnets used for moving the individual conveying elements 2 and 4.

Figure 4B:
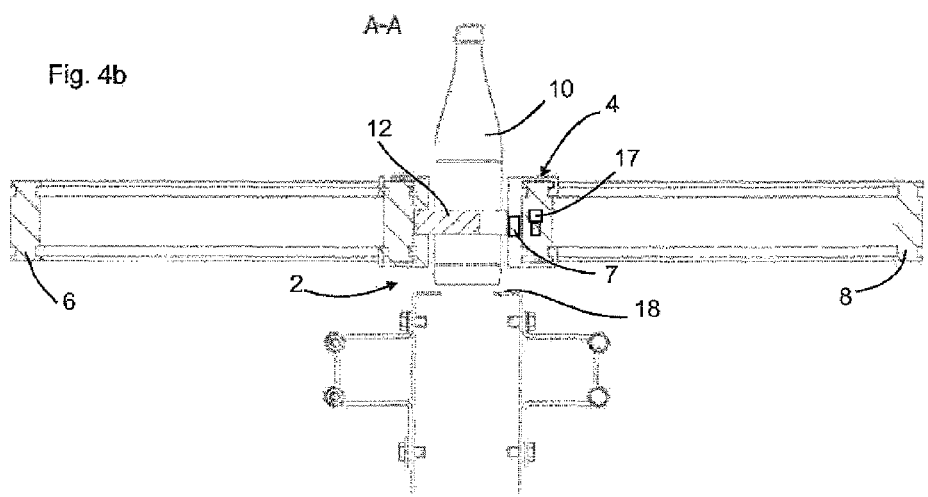
FIG. 4b shows a further lateral view of the apparatus in FIG. 3.

FIG. 4b shows a further view of the apparatus shown in FIG. 2. What can be further seen here is again the support unit 16 used for supporting the containers. This support unit is here mounted below the containers in the longitudinal direction L of the containers 10.

The conveying elements 2 and 4 have here at the same time also the function of stabilising the containers in the direction R, i.e. vertically to the transport path P, so that the containers will not laterally tip or fall off. The two contacting elements 12 and 14 are here respectively arranged to be movable relative to their base bodies 24 and 44. In this way, also a rotation of the containers may be effected.

The Applicant reserves the right to claim all of the features disclosed in the application documents as being essential to the invention insofar as they are novel over the prior art either individually or in combination.

LIST OF REFERENCE NUMERALS

1 Apparatus
2 First conveying elements
4 Second conveying elements
5 Conveyor unit
6 Circulating carrier
7 Permanent magnet
8 Circulating carrier
10 Groups of containers/containers
12 First contacting body
14 Second contacting body
16 Support unit
17 Electromagnets
18 Carriers (for support unit 16)
20 Drive unit
22 Position detection unit
24 Base body
30 Control unit
32 Guiding unit
44 Base body
46 Recesses
48 Synchronisation start wheel
52 Recess
AA Line
D Distance between containers
L Longitudinal direction
P Transport path
R Direction

The invention claimed is:

1. A method for transporting containers or groups of containers, wherein a plurality of containers or groups of containers is conveyed along a predefined transport path and with a predefined distance (D) between the containers or groups of containers and a conveyor unit, which conveyor unit transports the containers or groups of containers using at least two first conveying elements for conveying the containers or groups of containers, which first conveying elements respectively move along a first predefined movement path on a circulating carrier, and which first conveying elements contact the containers or groups of containers with respectively one contacting body and in this way vary a distance between the containers or groups of containers, wherein the conveying elements are driven using a drive unit implemented as a linear motor, which drive unit is in operative connection with magnets of the conveying elements and a control unit allows an independent movement of the first conveying elements, so that the distance between two conveyed containers or groups of containers can be changed, and the speed of the containers modified during transport thereof by the first conveying elements by way of a lateral engagement.

2. The method as claimed in claim 1, wherein the containers are supported by a support unit at least at times during transport by the first conveying elements.

3. The method as claimed in claim 1, wherein the containers are guided during transport thereof by the first conveying elements also in a direction extending parallel to the transport path.

4. The method as claimed in claim 1, wherein the transport elements are at least times moved also in a direction opposite to a transport direction of the containers or groups of containers, wherein this movement is used for returning the conveying elements relative to their carrier.

5. The method as claimed in claim 1, wherein a speed of movement of the conveying elements in a direction opposite to the transport path of the containers is at least at time higher than a transport speed of the conveying elements along or in the direction of the transport path.

6. The method as claimed in claim 1, wherein an average speed of the conveying elements running in a direction opposite to the transport path or the transport direction of the containers is higher than an average speed of the conveyer elements running in the transport direction of the containers or groups of containers.

7. An apparatus for transporting containers or groups of containers using a first conveyor unit that transports the containers or groups of containers along a predefined transport path (P) which conveyor unit has a support unit for supporting the containers or groups of containers during transport thereof, including at least two first conveying elements for conveying the containers or groups of containers, which first conveying elements are respectively arranged along a first predefined travel path in a manner to be movable on a circulating carrier, and which conveying elements each have a contacting body for contacting the containers or groups of containers as well as respectively at least one permanent magnet,
wherein the apparatus has a drive unit implemented as a linear motor for driving the conveying elements, which drive unit is in operative connection with the permanent magnets of the conveying elements in order to move the latter, and the apparatus includes a control unit that allows an independent movement of the first conveying elements, so that a distance (D) between two conveyed containers can be changed, and the speed of the containers modified during transport thereof by the first conveying elements by way of a lateral engagement.

8. The apparatus as claimed in claim 7, wherein the apparatus has at least one second conveying element for conveying the containers, which second conveying element is arranged to be movable along a second predefined movement path on a second circulating carrier, and said second conveying element has a contacting body for contacting the containers.

9. The apparatus as claimed in claim 7, wherein at least one container can be conveyed along the transport direction thereof between a contacting body of said second conveying element and a contacting body of a first conveying element.

10. The apparatus as claimed in claim 7, wherein the apparatus includes a position detection unit for detecting a position of at least one conveying element along the transport path.

11. The apparatus as claimed in claim 7, wherein at least one conveying element includes a base body and said contacting body is provided in a movable manner on said base body.

12. The apparatus as claimed in claim 7, wherein a drive unit for generating a movement of said contacting body relative to said base body is provided.

13. The apparatus as claimed in claim 7, wherein the apparatus includes at least one guiding unit that guides a movement of the containers in a direction extending parallel to the transport path.

14. The apparatus as claimed in claim 7, wherein the apparatus is designed in such a way that the speed of the containers during transport thereof by the conveying elements is changed by way of a lateral engagement.

15. The apparatus as claimed in claim 7, wherein the transport elements are at least times moved also in a direction opposite to a transport direction of the containers or groups of containers, wherein this movement is used for returning the conveying elements relative to their carrier.

16. The apparatus as claimed in claim 7, wherein a speed of movement of the conveying elements in a direction opposite to the transport path of the containers is at least at time higher than a transport speed of the conveying elements along or in the direction of the transport path.

17. The apparatus as claimed in claim 7, wherein an average speed of the conveying elements running in a direction opposite to the transport path or the transport direction of the containers is higher than an average speed of the conveyer elements running in the transport direction of the containers or groups of containers.

* * * * *